United States Patent [19]

Camden, Jr. et al.

[11] Patent Number: 4,637,915
[45] Date of Patent: Jan. 20, 1987

[54] NUCLEAR REACTOR FUEL ASSEMBLY AND METHOD OF FORMING SAME

[75] Inventors: Thomas M. Camden, Jr., Washington Township, Fayette County; Thomas R. Freeman, New Alexandria, both of Pa.

[73] Assignee: Westinghouse Electric Corp., Pittsburgh, Pa.

[21] Appl. No.: 609,250

[22] Filed: May 11, 1984

[51] Int. Cl.⁴ .............................................. G21C 3/32
[52] U.S. Cl. .................................. 376/435; 376/267; 376/445; 376/447; 376/451; 376/456
[58] Field of Search ............... 376/435, 445, 447, 451, 376/456, 267

[56] References Cited

U.S. PATENT DOCUMENTS 3,425,908 2/1969 Rouge et al. .
3,586,603 6/1972 Hines .
3,679,545 7/1972 Leirvik .
4,125,433 11/1978 Iljunin et al. .
4,130,460 12/1978 Iljunin .................. 376/348

FOREIGN PATENT DOCUMENTS 923633 4/1963 United Kingdom ................ 376/435

Primary Examiner—Donald P. Walsh

[57] ABSTRACT

A nuclear fuel assembly, particularly advantageous for use in a pressurized water reactor, wherein each alternate fuel rod in the assembly is positioned with its fission gas plenum zone at the top of the assembly and the intervening alternate fuel rods are positioned with their fission gas plenum zones at the bottom of the assembly. All of the fuel rods are preferably axially coextensive. An axial blanket region may be formed by providing the fuel zone of each fuel rod with a small zone of natural or depleted uranium at a part of the fuel zone furthest from the fission gas plenum zone. A method of effectively lengthening the active length of a nuclear fuel assembly is also described.

11 Claims, 3 Drawing Figures

NUCLEAR REACTOR FUEL ASSEMBLY AND METHOD OF FORMING SAME

BACKGROUND OF THE INVENTION

1. Field of the Invention

The present invention relates to nuclear fission reactors and more particularly pressurized water reactor (PWR) fuel assemblies. The present invention also relates to a method of forming a PWR fuel assembly to obtain enhanced fuel utilization.

2. Description of the Prior Art

The generation of a large amount of heat energy by nuclear fission in a nuclear reactor is well known. This energy is dissipated as heat in elongated nuclear fuel rods. A plurality of nuclear fuel rods are typically grouped together in an array to form separately removable fuel assemblies. A number of such nuclear fuel assemblies are generally arranged in a matrix to form a nuclear core capable of a self-sustained, nuclear fission reaction. The core is typically submersed in a fluid, such as light water, that serves as a coolant for removing heat from the nuclear reactor fuel rods and as a neutron moderator.

In a typical fuel assembly, the fuel rods contain a fuel zone which typically comprises a stack of enriched nuclear fuel pellets encased in a length of tubular cladding material. A fission gas plenum zone is typically disposed in the cladding, above the fuel zone for collecting fission product gases generated within the fuel rods during burnup.

In some prior designs, such as that described in U.S. Pat. No. 3,425,908 the fuel rods are held in a spaced, lateral array but are axially displaced from each other to form a transverse cross section in the shape of a paraboloid or spherical dome. In this configuration, the fission gas plenum zones are axially displaced with respect to each other but are all located at the top of the fuel rods as they are held in the fuel assembly.

U.S. Pat. No. 3,586,603 describes a fuel assembly having laterally offset fission gas plenum zones which permit the reduction in the core coolant pumping requirements. In this configuration, all of the fission gas plenum zones remain adjacent to each other at the top of fuel assembly.

In U.S. Pat. Nos. 4,125,433 and 4,130,460 fuel assemblies for nuclear fuel reactors are described having centrally disposed fuel rods with fission gas plenums extending in one axially direction from the fuel zone while the fission gas plenum zones of the pheripheral rods are grouped together and extend in the opposite axial direction. The fuel zones of all the fuel rods of the fuel assemblies of both references are "coextensive, having no offset.

In U.S. Pat. No. 3,679,545 there is described a nuclear fuel rod or control rod design which utilizes resilient, corrugated spacer members disposed within a cladding tube to establish plenum zones. The plenum zones may be located at the top, at the bottom, within a middle region, or any combination of the above within the fuel or control rod.

In U.K. Pat. No. 923,633 there is disclosed a method of charging a heterogeneous nuclear reactor to obtain better fuel utilization by dividing the fuel lattice to axially zones and transporting fuel rods from zone to zone to equalize the fuel burnup.

In co-pending commonly assigned application Ser. No. 609,252 filed concurrently herewith (Freeman, Wilson, and Knott) a boiling water reactor (BWR) fuel assembly is disclosed which operates to lower fuel cycle costs associated with BWR operation by providing a fuel assembly which is top to bottom reversible and which has some fuel rods with fission gas plenum zones at the top of the fuel assembly and some at the bottom to thereby increase the effective active length of the core and to increase the H/U ratio at the end of the core.

None of this prior art provides a method or apparatus for enhancing fuel utilization and for reducing neutron leakage in a PWR fuel assembly.

SUMMARY OF THE INVENTION

It is therefore the object of the present invention to provide an improved nuclear fuel assembly.

It is a further object of the present invention to provide a fuel assembly for a PWR in which fuel utilization is enhanced and neutron leakage is reduced.

It is still a further object of the present invention to provide an improved fuel assembly with reduced axially power peaking.

It is still further object of the present invention to provide an improved method of forming a nuclear fuel assembly.

To achieve the foregoing and other objects and in accordance with the purpose of the present invention as embodied and broadly described herein, a nuclear fuel assembly is provided which comprises a top nozzle assembly, a bottom nozzle assembly spaced from the top nozzle assembly and a plurality of guild thimble tubes extending between the top and bottom nozzle assemblies. A plurality of spacer grid assemblies are provided which are axially spaced along and attached to the guild thimble tubes. In addition, a plurality of fuel rods are held in a spaced lateral array between the top and bottom nozzle assemblies by the spacer grid assemblies. Each of the fuel rods includes a fuel zone and a fission gas plenum zone. A first group of the fuel rods are disposed in the fuel assembly with the fission gas plenum zone adjacent the top nozzle assembly and a second group of the fuel rods are disposed in the fuel assembly with the fission gas plenums adjacent to the bottom nozzle assembly.

Preferably, an end of the fuel zone furthest from the fission gas plenum zones will comprise an axial blanket zone in order to reduce axial neutron leakage. This axial blanket zone may be formed by substituting some depleted nuclear fuel, natural uranium, or uranium of lower enrichment than the enriched fuel.

Preferably, the fuel zones of the first group of the fuel rods are axially shifted with respect to the fuel zones of the second group of fuel rods by an amount substantially corresponding to the axial length of the fission gas plenum zone in order to increase the effective active fuel length of the fuel assembly by an amount corresponding to the axial length of the fission gas gas plenum zone.

In accordance with another aspect of the present invention, a method for increasing the effective active length of a nuclear fuel assembly comprising an array of fuel rods having fuel zones and fission gas plenum zones is provided. The method comprises arranging a first group of fuel rods in the fuel assembly with fission gas plenums at the top of the fuel assembly and arranging a second group of fuel rods in the fuel assembly with the fission gas plenums at the bottom of the fuel assembly.

The fuel rods are aligned in the fuel assembly to be substantially axially coextensive.

Preferably, the fuel zone contains enriched nuclear fuel and the method further comprises forming an axial blanket zone by inserting material having a lower enrichment than the enriched nuclear fuel at a portion of the fuel zone furthest from the fission gas plenum zone.

The present invention enhances the utilization of nuclear fuel. With alternate fuel rod fission gas plenum zones at the bottom of fuel assembly and intervening alternate fission gas plenum zones at the top, approximately 15–20 cm long regions are created at the top and bottom of the fuel assembly where the H/U ratio is substantially doubled. This results in enhanced fuel utilization and improved axial power distribution.

In conventional fuel assemblies, power generation at the top and bottom of the assembly was very low and the nuclear fuel at those locations remained largely unspent and wasted. By removing approximately half of the enriched nuclear fuel at the extreme ends of the fuel assembly, the H/U is improved and more neutrons become thermalized, thus increasing the probability of fission resulting in the generation of more power at the top and bottom regions of the fuel assembly.

Moreover, since the active fuel zones with the present invention will extend from adjacent the bottom nozzle assembly to adjacent the top nozzle assembly, the present invention results in a nuclear core that is effectively lengthened by the length of the fission gas plenum zone without any increase in the physical axial length of the fuel assembly.

The present fuel assembly design also results in lower neutron leakage from the core over the lifetime of the fuel assembly. Since power generation at the top and bottom of the core is increased, as burnup progresses, the top and bottom of the core will be at higher power and will burn up to a greater extent than in conventional fuel assemblies. Therefore, (where no axial blanket is provided), although the initial neutron leakage may be slightly higher, as burnup progresses the neutron leakage will actually be reduced. The increased axial length of the active fuel region also serves to reduce neutron leakage. As will be understood by the artisan, where the offset regions B illustrated in FIG. 3 are filled with natural uranium or depleted uranium instead of enriched nuclear fuel, these regions can function as axial blankets to enhance neutron economy by absorbing escaping neutrons from the over-enriched parts of the core. These escaping neutrons are thermalized by the coolant and absorbed by the nuclear fuel in this blanket region and can produce additional power as well as plutonium which can be put to future commerical use.

BRIEF DESCRIPTION OF THE DRAWINGS

The accompanying drawings, which are incorporated in and form a part of the specification, illustrate a preferred embodiment of the present invention and together with the description, serve to explain the principles of the invention. In the drawings.

DETAILED DESCRIPTION OF THE INVENTION

Figure 1:
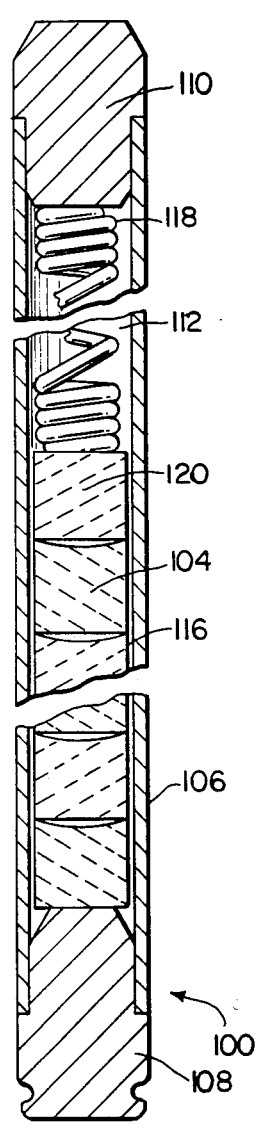
FIG. 1 depicts a plan, fragmentary, sectional view of a fuel rod having a fission gas plenum zone disposed at the top of the rod.
Figure 2:
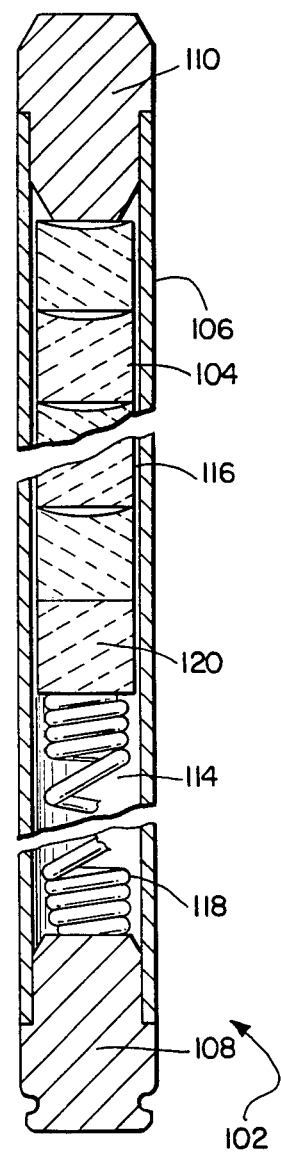
FIG. 2 depicts a plan, fragmentary, sectional view of a fuel rod having a fission gas plenum zone disposed at the bottom of the rod.

Reference will now be made in detail to the presently preferred embodiment of the invention, an example of which is illustrated in the accompanying drawings. Two types of fuel rods are utilized in practicing the present invention, an example of each being illustrated in FIGS. 1 and 2. The fuel rods depicted in FIG. 1 and FIG. 2 are similar, the major difference being the location of the fission gas plenum zone. Therefore, similar numerals will be used to designate similar elements in the two figures. For convenience, the fuel rod of FIG. 1 will be designated 100 and the fuel rod of FIG. 2 will be designated 102. The majority of the axial length of each fuel rod comprises of a column of fuel pellets 104. The pellets 104 may comprise slightly enriched uranium oxide ($UO_2$) powder which has been compacted by cold pressing into right circular cylinders which are then sintered to the required density. Preferably, the ends of the pellets 104 may be slightly dished to allow greater axial expansion at the ends of the pellets. The pellets 104 are encased in a tubular cladding 106 which is preferably formed from an alloy of zirconium commonly known as Zircaloy. Each fuel rod is plugged at its ends by a lower end plug 108 and an upper end plug 110. Preferably, the ends plugs 108 and 110 are welded to the cladding 106 to seal the fuel pellets 104 from contact with reactor coolant during use.

Fuel rods 100 have fission gas plenums 112 at an upper end thereof and fuel rods 102 have fission gas plenums 114 at a lower end thereof. The fission gas plenum zones 112 and 114 are provided to accommodate fission gases released from the fuel during burnup and also to accommodate thermal expansion of the fuel pellets 104 and to accommodate fuel density changes during irradiation. A gap 116 may also be provided between the fuel pellets 104 and the cladding 106 to accommodate changes in the fuel and cladding during irradiation and to avoid overstressing the cladding.

In order to maintain the fission gas zones 112 and 114, compression springs 118 are provided. In FIG. 1, the compression spring 118 bears against the upper end plug 110 and a ceramic pellet 120. The ceramic pellet 120 is preferably formed of zirconium oxide ($ZrO_2$) and is provided to prevent direct contact between the compression spring 118 and the fuel pellets 104. The ceramic pellet 120 is preferably a similar size and shape to fuel pellets 104. The spring 118 preferably comprises a helically-formed stainless steel spring which is inserted into the fuel rod after the fuel pellets 104 are stacked to the required height and "topped off" with the ceramic pellet 120. It should be understood that the ceramic pellet 120 can be omitted if desired. Preferably, after inserting the compression spring 118, the end plug (110 in FIG. 1 and 108 in FIG. 2) is inserted into the cladding 106, pressed into place, and welded. The fuel rods 100 and 102 may be internally pressurized with helium or the like during welding in order to minimize compressive cladding stresses and to prevent cladding flattening during operation due to coolant operating pressures. It should be understood that the compression springs 118 also prevent shifting of the fuel pellets 104 in the cladding 106 during shipping and handling operations.

Figure 3:
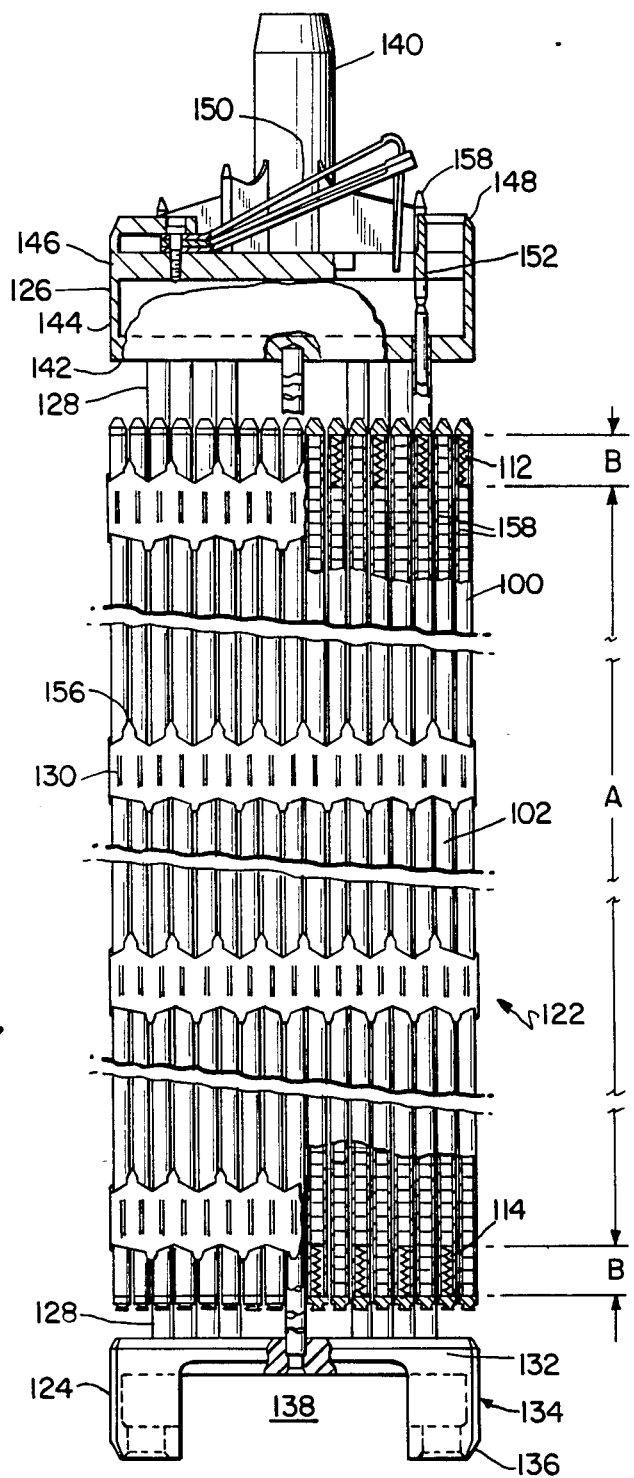
FIG. 3 depicts a plan, fragmentary view, in partial section of an exemplary fuel assembly using fuel rods similar to those of FIGS. 1 and 2.

Turning now to FIG. 3 there is illustrated a exemplary fuel assembly utilizing fuel rods 100 and 102 of FIGS. 1 and 2 respectively. In addition to fuel rods 100 and 102, the basic structural elements of the fuel assembly 122 comprises a bottom nozzle assembly 124, a top nozzle assembly 126, guild thimble tubes 128, and one or more spacer grid assemblies 130. A typical fuel assembly having a 17×17 lattice may comprise over 260 fuel rods 100 and 102, about 25 guild thimble tubes 128, one of which may accommodate instrumentation. The fuel rods 100 and 102 are loaded into the fuel assembly 122 so that there will be a clearance between the fuel rods and the top and bottom nozzle assemblies 126 and 124 respectively.

The bottom nozzle assembly 124 serves as the bottom structural element of the fuel assembly 122 and directs coolant flow distribution through the assembly. A typical bottom nozzle assembly has a generally square shape and is preferably fabricated from reactor-grade stainless steel. Preferably, the bottom nozzle assembly comprises a perforated plate 132 and four angle legs 134, each of which has a bearing plate 136 for supporting the fuel assembly 122 on a lower core plate (not illustrated). Axial loads imposed on the fuel assembly 122 and the weight of fuel assembly are transferred through the bottom nozzle assembly 124 to the lower core plate. The angle legs 134 form a plenum 138 for coolant inlet flow to the fuel assembly. The perforated plate 132 allows coolant to flow upward through the fuel assembly but prevents any accidental downward ejection of fuel rods 100 and 102 from the fuel assembly 122. The bottom nozzle assembly 124 is preferably fastened to the control rod guild thimbles 128 by weld lock screws or the like (not illustrated) which penetrate through the bottom nozzle 124 and are fastened through the guild thimble tubes 128.

Coolant flows from the plenum 138, through the perforated plate 123 and through channels formed between adjacent fuel rods 100 and 102.

The top nozzle assembly 126 functions as the upper structural element of the fuel assembly 122 and provides a partial protective housing for a control rod cluster control assembly 140 and other core components. The top nozzle assembly comprises an adaptor plate 142 and enclosure 144, a top plate 146, and pads 148. Hold-down springs 150 are generally mounted on the top plate 146 by bolts or clamps or the like. The hold-down springs 150 are preferably made of a reactor-grade steel commonly known as Inconel. Pads 148 are positioned on the corners of the top nozzle 126 adjacent to the hold-down springs 150. Pads 148 may contain alignment holes for locating the upper end of the fuel assemblies 122 in the core.

The adaptor plate 142 is generally square-shaped and is provided with a plurality of penetrations or holes to permit upward coolant flow through the top nozzle assembly 126. Penetrations may also be provided to accept sleeves or the like (not illustrated) which may be welded to the adaptor plate 142 and to which the guild thimble tubes 128 are attached. The adaptor plate also prevents the accidental upward ejection of the fuel rods 100 and 102 from the fuel assembly 122.

The enclosure 144 is typically a box-like structure, the height of which fixes the distance between the adaptor plate 142 and the top plate 146. The top plate 146 is provided with a large central hole to accommodate control rods 152 and a control rod spider 154.

The guild tube thimbles 128 are structural members which also provide channels for control rods 152 or other elements such as burnable poison rods, neutron sources, thimble plug assemblies or the like. The guild tube thimbles 128 are preferably fabricated from zircaloy tubing having two different diameters, the larger diameter being at the top of the tube. The larger tube diameter at the top section provides an annular area necessary to permit rapid control rod insertion during a reactor trip. The lower portion of the guild tube thimbles are preferably swaged to a smaller diameter to reduce diametral clearances and to produce a dashpot action near the end of the control rod travel during normal reactor trip operation. Holes may be provided along the guild thimble tubes 128 above the dashpot to reduce the control rod drop time. As mentioned above, the top end of the guild thimble tubes may be fastened to a tubular sleeve which fits into and is welded to the top nozzle adaptor plate 142. Also as mentioned above, the lower end of the guild thimble tubes 123 may be fitted with an end plug which is fastened to the perforated plate 132 of the bottom nozzle assembly 124 by a weldlock screw or the like.

The grid assemblies 130 may be fastened to the guild thimble tube 128 in a known manner to create an integrated structure. The fuel rods 100 and 102 are supported at intervals along their length by the grid assembly 130 which maintain the lateral spacing between the fuel rods 100 and 102. Each fuel rod 100 and 102 is supported within each grid assembly 130 by a combination of support dimples and springs in a well known manner. The magnitude of the grid restraining force on the fuel rods 100 and 102 is set high enough to minimize possible fretting without overstressing the cladding 106 at the points of contact between the grid assemblies 130 and the fuel rods 100 and 102. The grid assemblies 130 also allow for axial thermal differential expansion of the fuel rods.

The grid assemblies 130 may also include mixing vanes 156 which project into the coolant stream to promote mixing of the coolants.

A fuel assembly according to the present invention has a central fuel region "A" where fuel regions 158 of fuel rods 100 and 102 overlap. In addition, the fuel assembly 122 has peripheral regions "B" at its axial ends where a fission gas plenum 112 or 114 is positioned adjacent a part of the fuel region 158. In a typical fuel assembly, the overall length of a fuel rod is on the order of about 380 to 390 cm, the fission gas plenum zone occupying about 15–20 cm of that length. Taking into account the axial dimensions of the upper and lower end plugs 108 and 110, the axial length of the active fuel region 158 will be on the order of about 360–375 cm. With the present invention, the effective axial length of the core is extended approximately 15–20 cm (the length of the fission gas plenum zone) or about 4 to 5% over conventional fuel assemblies where all of the fission gas plenum zones are positioned adjacent to each other or oriented together at the top or bottom of the fuel assembly.

While in the embodiment illustrated, the active core height is effectively lengthened by inverting the position of the fission gas plenum zones 112 and 114 of adjacent fuel rods 100 and 102, it should be understood that other groupings of fuel rods 100 and 102, which for a particular fuel assembly design will provide optimum nuclear performance while still realizing an effectively lengthened core may be utilized. For instance, instead of alternating the orientation of adjacent fuel rods, it may be possible alternate the orientation of adjacent rows of fuel rods or to group the fuel rods 100 and 102 in 2×2 subgroupings. The particular reversal groupings will depend on the nuclear characteristics of a particular fuel assembly.

Thus, the inverted fuel rod assembly design of the present invention provides for higher fuel utilization by achieving an effectively longer core although the physical length of the core remains unchanged. The larger H/U ratio at the ends of the fuel assembly also contribute to more complete fuel utilization. Further, end region B of the fuel assemblies may be formed to function as axial blankets which capture neutrons and minimize the effects of axial power peaking.

It should be understood that the fuel assembly 122 of the present invention only "looks" longer than a conventional fuel assembly in a nuclear sense, its physical dimensions remain unchanged. Therefore, fuel assemblies according to the present invention can be interchanged in a reactor core with prior art fuel assemblies during refueling. Moreover, since coolant will flow along an effectively increased heating zone due to the increased active fuel length, heat transfer from the core is enhanced. Only minor fuel rod changes are required to achieve the advantages and benefits mentioned above, specifically the inversion of about half of the fission gas plenum zones.

In order to realize an axial blanket effect, on the order of about 10-25 cm and more particularly about 15-20 cm of fuel pellets 104 adjacent to the end plug 108 of the fuel rods 100 and adjacent to the end plug 110 of the fuel rods 102 should be replaced by natural uranium, depleted uranium pellets or the like which will absorb neutrons from the center of the core.

The foregoing description of the preferred embodiment has been presented for purposes of illustration and description. It is not intended to be exhaustive or limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:
1. A nuclear fuel assembly comprising:
a top nozzle assembly;
a bottom nozzle assemble spaced from said top nozzle assembly
a plurality of guild thimble tubes extending between said top and bottom nozzle assemblies;
a plurality of spacer grid assemblies axially spaced along and attached to said guild thimble tubes;
a plurality of fuel rods held in a spaced lateral array between said top and bottom nozzle assemblies by said spacer grid assemblies, each of said fuel rods comprising a fuel zone and a fission gas plenum zone wherein a first group of said fuel rods are disposed in said fuel assembly with said fission gas plenum zone adjacent said top nozzle assembly and a second group of said fuel rods are disposed in said fuel assembly with said fission gas plenums adjacent said bottom nozzle assembly and wherein the fuel zone of said first group of fuel rods is axially shifted with respect to the fuel zone of said second group of fuel rods.

2. The nuclear fuel assembly of claim 1 wherein an end (B) of said fuel zone comprises an axial blanket zone to reduce axial neutron leakage.

3. The nuclear fuel assembly of claim 2 wherein said fuel zone contains enriched nuclear fuel and wherein said axial blanket zone contains one of depleted nuclear fuel, natural uranium and uranium of lower enrichment that said enriched nuclear fuel.

4. The nuclear fuel assembly of claim 1 wherein said first group of fuel rods comprises substantially each alternate fuel rod in said nuclear fuel assembly and said second group of fuel rods comprises remaining intervening alternate fuel rods in said nuclear fuel assembly.

5. The nuclear fuel assembly of claim 1 wherein the fuel zones of said first group of fuel rods are axially shifted with respect to the fuel zones of said second group of fuel rods by an amount substantially corresponding to an axial length of said fission gas plenum zone and wherein said nuclear fuel assembly has an effective active fuel length substantially corresponding to the length of said fuel zone plus said fission gas plenum zone.

6. The nuclear fuel assembly of claim 1 wherein said first and second groups of fuel rods are substantially axially coextensive.

7. The nuclear fuel assembly of claim 5 wherein said plurality of fuel rods are all of substantially equal axial length and are disposed in said nuclear fuel assembly to extend through substantially the same axial space to form a substantially rectangular array in the axial direction.

8. A method for obtaining enhanced fuel utilization and for increasing the effective active length of a nuclear fuel assembly comprising an array of fuel rods, each fuel rod having a fuel zone and a fission gas plenum zone at opposite ends thereof, said method comprising the steps of:
arranging a first group of said fuel rods in said fuel assembly with the fission gas plenum zones thereof at a top of said fuel assembly;
arranging a second group of said fuel rods in said fuel assembly with the fission gas plenum zones thereof at a bottom of said fuel assembly;
positioning the fuel rods in said fuel assembly to form a substantially axially coextensive array of fuel rods having top and bottom zones containing both fuel zones and fission gas plenum zones.

9. The method of claim 8 wherein said fuel zone contains enriched nuclear fuel and further comprising the step of forming an axial blanket zone by inserting material having a lower enrichment that said enriched nuclear fuel in a portion of said fuel zone furthest from said fission gas plenum zone.

10. The method of claim 8 wherein said step of positioning said fuel rods further comprises the step of shifting the fuel zones of said first group of fuel rods with respect to the fuel zones of said second group of fuel rods by a distance substantially corresponding to said top and bottom zones.

11. The method of claim 8 wherein the said step of arranging said first group of fuel rods further comprises arranging substantially each alternate fuel rod in said fuel assembly with the fission gas plenum zone in the top zone and the step of arranging said second portion of fuel rods further comprises arranging remaining alternate intervening fuel rods in said fuel assembly with said fission gas plenum zones in the bottom zone.

* * * * *